3,515,295
DEVICE FOR CARGO TRUCKS FOR TRANSPORTING AND LATERAL LOADING AND UNLOADING
Kaspar Klaus, 46 Schlachthofstrasse,
894 Memmingen, Germany
Filed May 21, 1968, Ser. No. 730,728
Claims priority, application Germany, May 26, 1967,
K 62,390
Int. Cl. B60p 1/48
U.S. Cl. 214—77                5 Claims

ABSTRACT OF THE DISCLOSURE

A means on a cargo vehicle for the transportation and the lateral loading and unloading of the loading surface of the vehicle and particularly stacked building stones in which a first lifting device is arranged in front of the loading surface and a second lifting device behind the loading surface and a pair of gripping tongues is operably related to each lifting device. The gripping tongues extend essentially over the full space between the lifting devices and include a central part and two laterally arranged gripping plates, with the gripping plates being pivoted about points parallel to the longitudinal axis of the vehicle so that the width of the central part corresponds approximately to half the width of the loading surface. Means are operably related to the gripping plates so that the plates can be tilted upwardly about the pivot points in an approximately horizontal position in which the tongues are laterally movable over a stack load on the loading surface.

BACKGROUND OF THE INVENTION

The present invention relates to a device for cargo trucks for transporting and the lateral loading and unloading of the cargo truck with a load, particularly stacked building stones.

When transporting stacked building stones by cargo trucks, the difficulty arises that loading and unloading of the building stones is complicated. If the building stones are arranged on pallets, they can be loaded in stacks by a hoisting apparatus, e.g. a crane. However, because of the great number of pallets filling the loading surface of a cargo truck, the loading or unloading process is lengthy. Frequently, no hoisting apparatus is available at the place where the building stones are to be unloaded. The unloading of the building stones by tilting the loading surface leads to damage of the building stones and makes difficult the later necessary further transport of the building material.

A loading device for cargo trucks has been proposed which consists of two parts, whereby one part is arranged at the front and the other at the rear end of the loading surface. Each part of the loading surface consists of a pair of rocker arms which can be swung towards and away from each other. Between the two loading device parts, a pair of gripper tongues for the load may be arranged and by means of the gripper tongues it is possible to unload the load, particularly stacked building stones. As this loading device is fastened on the vehicle, the loading and unloading process may be carried out at any location.

The lifting height of the above-cited loading device is, however, limited. If the building stones are stacked relatively high, which is possible with a great loading capacity of the cargo truck, it is difficult to work with the gripper tongues as they cannot grip the stack from above, because of the limited lifting height of the loading device. The unloading of the full load in one single operation is not possible for the same reasons and also not because the lifting power of the loading device is not sufficient.

By the invention, a device for the above-cited purpose is provided which makes it possible to unload safely and quickly even if the load to be moved is relatively large in respect of its weight as well as the height dimensions.

SUMMARY OF THE INVENTION

The invention starts from a device on cargo trucks for the transport and the lateral loading and unloading of the cargo truck with a load, particularly stacked building stones making use of a two part loading device consisting of a pair of rocker arms each, one part of which is fixed at the front extremity and the other part of which on the rear extremity of the loading surface. This loading device carries a pair of gripper tongues for the load. The invention is characterized primarily by the fact that the pair of gripper tongues extends essentially over the full space between the two loading device parts, that the gripper tongues consist of a central part and two laterally arranged gripper plates, which gripper plates can be tilted around axles arranged parallel to the longitudinal axles of the vehicle, whereby the width of the central part corresponds approximately to half the width of the loading surface and whereby the gripping plates can be tilted upward by means of their tilting device in an approximately horizontal position in which position the pair of gripper tongues can be moved laterally over a stack of the load on the cargo truck.

It is to be appreciated that the invention is not only useful for the transport and for the loading and unloading respectively of a motor vehicle with building stones but also for other loads. The main field of application of the invention is, however, the transport of building stones and the loading and unloading respectively of such stacked building stones.

By means of the pair of tongues according to the invention it is possible to take up, when loading the cargo truck, half the load and to put it on the one side of the loading surface. As the gripping plates can be brought into an approximately horizontal position, the pair of gripping tongues can be guided above this stacked load even if it has only a limited lifting height, so that it is possible to take up also the second stack of the load and to put it down at the side of the first stack of the load. The loading process can thus be carried out quickly. The same applies for the unloading process. In this case the stacked load loaded in the end is gripped and unloaded first. Thereafter, the pair of gripping tongues is guided with the gripping plates tilted open over the other stack of building stones and this stack is also unloaded.

It has been found that it is sufficient if the two gripping plates enclose in their tilted-up position an obtuse angle which is advantageous in that the stability of the relatively long gripping plates is increased.

In a further embodiment, the invention provides that the cargo truck has a raised side only at the side of the stack loaded first. During transport, the pair of gripping tongues surrounds the other stack of load, secures it and thus prevents the falling down of one of the building stones.

The saving of the one raised side has the advantage on the one hand of a diminution of the total weight and accelerates, on the other hand, the loading and unloading process. It is favorable if the stacks of load are staggered during transport towards the central plane of the vehicle in the direction towards the first loaded stack. Since, during transport, the pair of gripping tongues surrounds and secures the second stack of the load and is thus not in the middle plane of the vehicle, a uniform distribution of the load on the vehicle is obtained.

The pair of gripping tongues securing the one stack of load during transport has also the further task of securing the first loaded stack. In this connection, it is advantageous if at least the gripping plate being essentially in the central plane of the cargo truck, has cover surfaces on both sides so that this gripping plate also supports with its outer surface the other stack. The drawings show diagrammatically an embodiment of the invention.

DETAILED DESCRIPTION OF THE INVENTION

Figure 1:
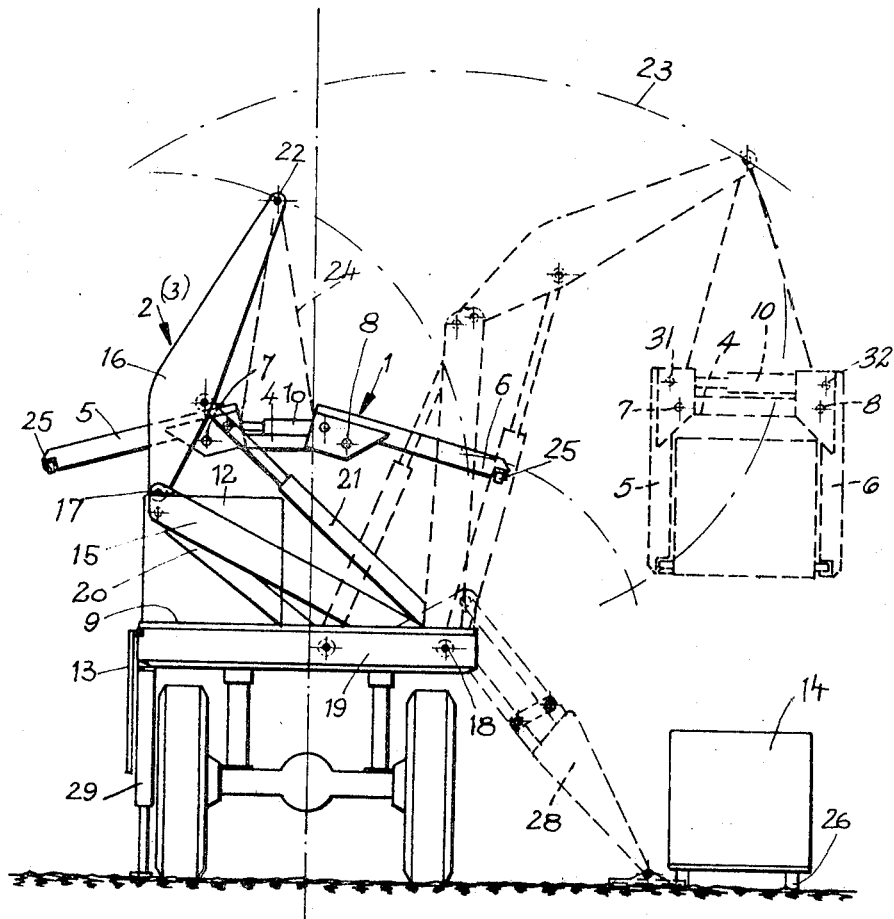
FIG. 1 is a rear view of a cargo truck with a device according to the invention during the loading process and FIG. 2 is a view similar to FIG. 1 showing the device in transport position.

A cargo truck 11 may be a motor truck, but it is also possible to arrange the present device on a trailer, e.g. a semi-trailer. A loading device part 2 is mounted at the rear extremity of the cargo truck 11. A similar loading device part 3 is provided at the front extremity of the vehicle or the front extremity of the loading surface respectively. Each loading device part consists essentially of two rocker arms 15 and 16 which are articulated to each other at 17. The rocker 15 is fixed on the cargo truck or a structural element 19, respectively, which is firmly connected with the cargo truck or a loading surface 9, respectively. For the drive of the rocker arm 15, i.e. for the rotation of the rocker arm 15 around a articulation point 18, a cylinder-piston unit 20 is provided while the rocker arm 16 is driven by a cylinder piston unit 21. An end point 22 of the rocker arm 16 can thus be moved in the space surrounded by dot and dash lines 23.

The pair of gripping tongues 1 consisting essentially of a central part 4, and two gripping plates 5 and 6 is suspended by means of a suspension defined by chains, wire ropes 24, or the like on the rocker arm 16. The gripping plates 5 and 6 are pivotal around axles 7 and 8 by means of a rocking device 10 consisting of a cylinder-piston unit. The ends of the gripping plates 5 and 6 are provided with pressure or gripping pieces 25 by means of which it is possible to grab a stack of stones 12 or 14 standing on a pallet 26. The use of a pallet 26 is, however, not necessary if the closing pressure of the gripping plates 5 and 6 is sufficiently great in order to exclude the falling-out of the building stones between the gripping plates.

It will be seen that the gripping plates 5 and 6 also carry pins 31 and 32 on which the cylinder-piston unit 10 is secured. When the unit 10 is operated so that the pins 31 and 32 approaches each other, that is to say the piston is retracted, the plates 5 and 6 open and the solid line position illustrated in FIG. 1 is maintained. However, if the unit 10 is operated so that the piston is extended, the dotted line position of the gripping tongues is realized.

While the suspension 24 can engage the central part 4, it is preferable if the fastening is effected in the zone of the pins 31 and 32.

The loading surface is furthermore provided on one side with a raised side 13.

Figure 2:
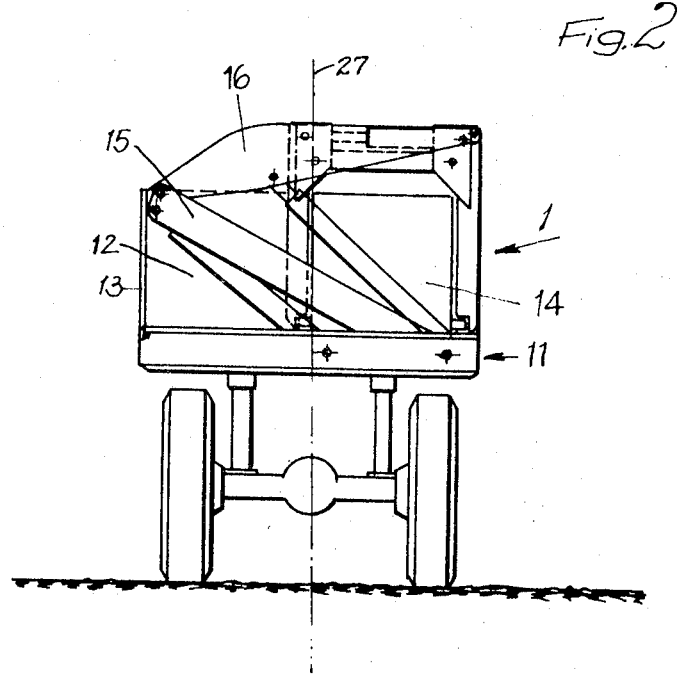

The mode of operation of the device according to the invention is as follows:

The rocker arms 15 and 16 are swung to the loading side of the vehicle 11 and the pair of gripping tongues grabs a stack of building stones and puts this stack on the loading surface 9 at the side remote from the loading side. Now, the gripping plates 5 and 6 of the pair of gripping tongues which extend essentially over the full length of the vehicle are opened, the pair of gripping tongues is lifted by a small amount and the opened pair of gripping tongues can be brought again into a position at the side of the vehicle. Then, the second stack of stones 14 is grabbed and placed with the pair of closed gripping tongues besides the already loaded stack of stones 12. The raised side 13 is closed and the vehicle is ready for transport after the rocker arm 16 has been slightly lowered. The transport position is shown in FIG. 2. While the raised side 13 secures one side of the load, the other side of the load is covered by the gripping plate 6.

The gripping plate 5 fills the space between the two stacks of stones. The unloading process takes place in a reverse sequence.

In FIG. 2 dot-and-dash line 27 represents the central plane of the cargo truck 11. It can be seen clearly that the two stone stacks 12 and 15 are offset laterally from the central plane so that the complete load including the loading device and the pairs of gripping tongues which are arranged asymmetrically is in equilibrium.

The cargo truck may have, as is generally known, rear and front raised sides, which are, however, not shown in the drawings.

In order to exclude an extraordinarily strong inclination or a tipping over of the vehicle during the loading process it is favorable if, on the building element 19, a pivotal support brace 28 is arranged which extends towards the loading side. A further support brace 29 which can merely be lifted or retracted can likewise be provided for a better support of the vehicle during the loading process. In the transport position according to FIG. 2, these support braces 28 and 29 are retracted. In the drawing of the transport position (FIG. 2) these support braces are omitted.

In order to attain the object according to the invention, it is sufficient if only the gripping plate 5 can be tilted upward in the described manner. In order to exclude an inclination of the opened pair of gripping tongues 1 a symmetrical configuration of the pair of gripping tongues is recommended.

What is claimed is:

1. Means on cargo vehicles for transporting and the lateral loading and unloading of a vehicle having a loading surface extending along the longitudinal axis of the vehicle, particularly stacked building stones, said loading means including a first lifting unit arranged in front of the loading surface and a second lifting unit behind the loading surface, each unit including two pivotally connected rocker arms, said arms pivoting about an axis which is parallel to the longitudinal axis of the vehicle, means pivotally connecting one arm of each unit to the vehicle, power operated means for moving each said one arm about its pivot to the side of the vehicle, power means for moving each other arm about its pivot to said one arm, a pair of gripping tongues for said lifting units, means operably connecting the gripping tongues to said other rocker arms, said gripping tongues extending essentially over the full space between said first and second lifting units, the pair of gripping tongues including a central part and two laterally arranged gripping plates for gripping and supporting a load therebetween, means pivoting said gripping plates about axes parallel to the longitudinal axis of the vehicle whereby the width of the central part corresponds approximately to half the width of the loading surface, and means operably connected to said gripping plates whereby said plates can be tilted upwardly about said pivot points in an approximately horizontal position in which the tongues are laterally movable over a stack load on the loading surface.

2. The means as claimed in claim 1 in which said central part between the laterally arranged gripping plates and means operably connected to said gripping plates are so constructed and arranged that the gripping plates can be moved into a relatively horizontal position whereby said plates define an obtuse angle with each other.

3. The means as claimed in claim 1, with two parallel load stacks, in which said vehicle is provided with a raisable side wall only at the side of the first loaded stack and during transport, said gripping tongues surrounding and securing the other load stack.

4. The means as claimed in claim 3 in which the load stacks are offset during transport towards the central plane of the vehicle in a direction toward the first loaded stack.

5. The means as claimed in claim 1 in which the gripping plate which during transport is essentially in the mid plane of the vehicle is provided with covering surfaces on both sides thereof.

References Cited

UNITED STATES PATENTS

| | | |
|---|---|---|
| 839,479 | 12/1906 | Howe. |
| 2,521,832 | 9/1950 | Cordivano. |
| 2,911,118 | 11/1959 | Tapp _____ 214—77 |
| 2,926,796 | 3/1960 | Martinson _____ 214— 78 X |
| 2,971,661 | 2/1961 | Isaacs _____ 214—80 |
| 3,057,490 | 10/1962 | Sauer _____ 214—77 |
| 3,174,630 | 3/1965 | Tantlinger et al. |
| 3,233,759 | 2/1966 | Turturro et al. _____ 214—80 |
| 3,243,224 | 3/1966 | Gutridge. |
| 3,251,496 | 5/1966 | Lamer et al. |
| 3,330,590 | 7/1967 | Sheridan et al. ____ 294—113 X |

FOREIGN PATENTS 823,664  11/1959  Great Britain.

GERALD M. FORLENZA, Primary Examiner

R. J. SPAR, Assistant Examiner

U.S. Cl. X.R.

294—67, 113